UNITED STATES PATENT OFFICE.

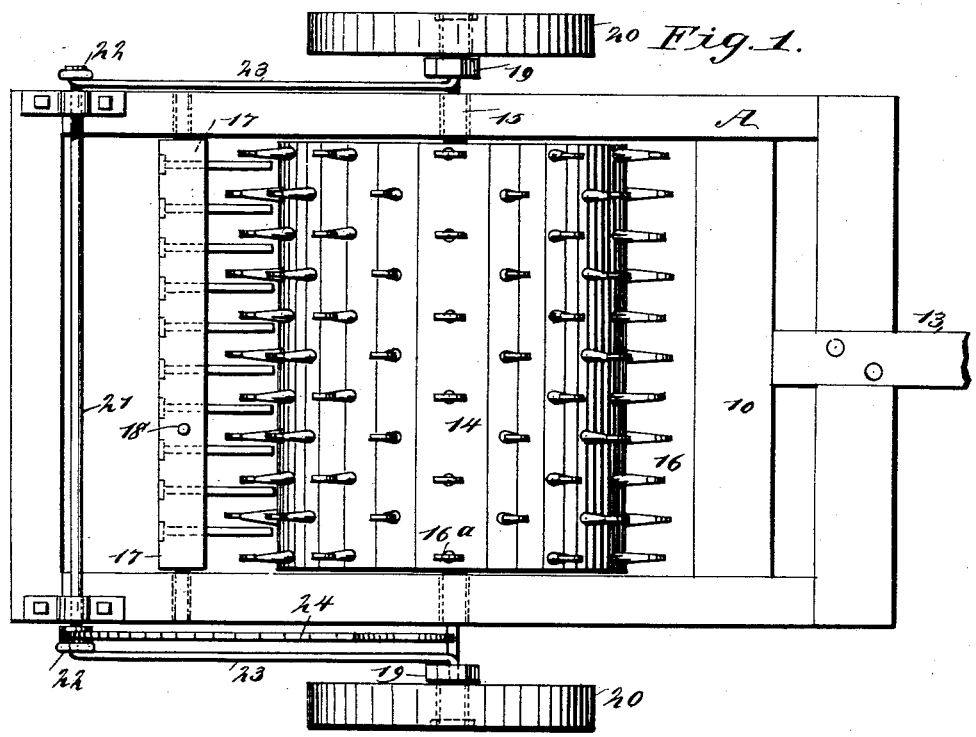

CHARLES WEHRENBERG, OF MOUND CITY, ILLINOIS.

HARROW.

SPECIFICATION forming part of Letters Patent No. 520,278, dated May 22, 1894.

Application filed June 14, 1893. Serial No. 477,576. (No model.)

*To all whom it may concern:*

Be it known that I, CHARLES WEHRENBERG, of Mound City, in the county of Pulaski and State of Illinois, have invented a new and useful Improvement in Harrows, of which the following is a full, clear, and exact description.

The invention is of the class of harrows having toothed revolving drums.

The invention consists in the novel construction and combination of the several parts, as will be hereinafter fully set forth and pointed out in the claim.

Reference is to be had to the accompanying drawings, forming a part of this specification, in which similar figures and letters of reference indicate corresponding parts in both the views.

Figure 1 is a plan view of the improved harrow, the seat being removed; and Fig. 2 is a side elevation thereof.

In carrying out the invention a frame A, is provided, which while it may be of any shape is usually made in skeleton form and of rectangular shape. The frame is usually provided with a front cross bar 10, upon which the standard 11 of the driver's seat 12, is located; and the pole or tongue 13, is usually attached to both the front bar of the frame and the cross bar 10. A drum or roller 14, of any desired diameter, is journaled by means of suitable trunnions 15 in the frame, ordinarily about its center. The drum or roller is provided with a series of teeth 16, and the teeth are arranged in rows extending over the periphery from end to end. The arrangement of the teeth in the rows is such that the teeth of one row will be placed about centrally opposite the space in the next row. In this manner the teeth are not only arranged in rows extending from end to end of the drum or roller, but likewise in circumferential rows. The teeth may be of any approved construction, but preferably, as shown in Fig. 2, they are provided with a spade-like outer end, which spade-like sections of the teeth are designated as 16ᵃ; and also preferably, instead of making the cutting edges, or outer edges of the spade-like sections flat, they are rendered more or less cylindrical, or semi-circular, as is likewise shown in Fig. 2. By means of this arrangement of the teeth, and owing to their peculiar shape at their heads or outer ends, the teeth will cut through the clods, separating them and pulverizing the entire surface over which they pass, and at the same time the teeth will leave the surface comparatively even.

In order to provide for cleaning the teeth, a toothed bar 17, is journaled in the frame at the rear of the toothed roller or drum, and the teeth of the bar are arranged in such manner that the teeth of the drum or roller will pass between them. The toothed bar is rocked so as to raise or lower its teeth through the medium of a lever 18, secured thereto in any suitable or approved manner and within convenient reach of the driver's seat.

Angled axles 19, are used in connection with the frame, the vertical members of the axles being pivoted to the frame preferably at a point below their centers, as shown in Fig. 2. The vertical members of the axles extend above and below the frame, and the supporting wheels 20 of the machine are mounted upon the horizontal members of the axles.

A crank shaft 21, is journaled in suitable bearings at the rear end of the machine frame, the crank arms 22 of the said shaft being located at its ends; and each crank arm is connected with the upper portion of the vertical member of an axle through the medium of a link 23, or its equivalent. The crank shaft is rocked or rotated through the medium of a lever 24, attached to it, usually near one end, and likewise placed within reach from the driver's seat.

In the operation of the machine, when it is desired to go from one field to another, by pressing down upon the lever 24, as shown in Fig. 2, the frame and roller or drum will be elevated to such an extent that the roller will be out of engagement with the ground. When the field to be harrowed is reached, by throwing the lever 24 to the rear, the frame will be thrown forward and downward, the wheels serving as a fulcrum and the axles as a carriage until the roller engages with the ground.

The harrow is exceedingly simple, it is durable and economic, and it is effective in operation.

Having thus described my invention, I claim as new and desire to secure by Letters Patent—

A harrow, comprising a frame, a toothed drum mounted therein, angled axles the vertical members of which are pivoted to the frame, wheels on the axle, a crank shaft in the rear part of the frame, links connecting the crank shaft with the vertical members of the angled axles, a lever for operating the crank shaft, a bar provided with cleaning teeth journaled in the frame in rear of the drum, and a lever for operating the said bar, substantially as described.

CHARLES WEHRENBERG.

Witnesses:
CHAS. HOFFAR,
P. T. LOESCHNER.